United States Patent [19]

Gercama et al.

[11] Patent Number: 4,501,764
[45] Date of Patent: Feb. 26, 1985

[54] MARGARINE FAT BLEND WITH A REDUCED TENDENCY TO SANDINESS

[75] Inventors: Anne Gercama, Chanteloup les, France; Robert Schijf, Vlaardingen, Netherlands

[73] Assignee: Lever Brothers Company, New York, N.Y.

[21] Appl. No.: 459,175

[22] Filed: Jan. 19, 1983

[30] Foreign Application Priority Data

Jan. 20, 1982 [GB] United Kingdom ................. 8201578

[51] Int. Cl.³ ............................................. A23D 5/00
[52] U.S. Cl. .................................................. 426/607
[58] Field of Search ................ 426/603, 604, 607, 608

[56] References Cited

U.S. PATENT DOCUMENTS

| 3,607,305 | 9/1971 | Westenberg | 426/607 X |
| 3,617,308 | 11/1971 | Graffelman | 426/607 X |
| 3,796,581 | 3/1974 | Frommhold | 426/607 X |
| 3,949,105 | 4/1976 | Wieske et al. | 426/607 |
| 4,045,588 | 8/1977 | Wieske | 426/607 |
| 4,230,737 | 10/1980 | Heider et al. | 426/607 |
| 4,341,812 | 7/1982 | Ward | 426/607 X |

FOREIGN PATENT DOCUMENTS 1113779 12/1981 Canada .
1121662 7/1968 United Kingdom .

Primary Examiner—Robert Yoncoskie
Attorney, Agent, or Firm—James J. Farrell

[57] ABSTRACT

A margarine fat blend with a reduced tendency to sandiness and a process for reducing development of sandiness in fat blends. The fat blends consist of an oil rich in linoleic acid and a fat having a level of palmitic acid residues of at least 10%, obtained by interesterification of a fat rich in palmitic acid residues and a hydrogenated oil.

17 Claims, No Drawings

MARGARINE FAT BLEND WITH A REDUCED TENDENCY TO SANDINESS

The present invention relates to a margarine fat blend with a reduced tendency to sandiness. More particularly the invention relates to a margarine fat with a relatively high level of poly-unsaturated fatty acid residues, particularly of the linoleic type, stemming from oils such as sunflower oil, soybeanoil, corn oil, rapeseed oil and the like. Preferred fat components are in general those which have a level of linoleic acid residues of at least 40%. In order to get a fat blend having an adequate consistency, by which term is meant that the amount of crystallized solid fat at a temperature ranging from 10° to 20° C. should preferably range from 10 to 20%, it is common to hydrogenate at least part of the fat. In order to get a fat blend having the right melting properties on consumption it is important that the oil is partially hydrogenated, preferably under conditions promoting isomerization e.g. in the presence of a sulphur-poisoned nickel catalyst precipitated on keiselguhr at a temperature ranging from 140° C. to 180° C. Under these conditions fats are obtained which have a relatively high content of trans-fatty acid residues.

These "trans-fats" are appreciated because they impart a certain coolness to the fat, which means that such fats have a rather steep melting curve within the temperature range of 15°–25° C. On the other hand these "trans-fats" sometimes cause sandiness.

Sandiness becomes apparent under the microscope in the form of relatively large needles consisting of high-melting fat crystals, the size of which ranges from 10 to 50 microns. Moreover, on consumption these fat crystals give an unpleasant sensation on the palate.

The risk of the development of sandiness and particularly the rate of formation of said large crystals can be controlled by processing and storage conditions.

It has been proposed in British Patent No. 1,121,662 to reduce sandiness in a hardened sunflower oil containing fat blend by interesterifying a mixture comprising hardened and unhardened sunflower oil. This interesterified mixture constitutes about 60% of the total blend. This relatively high level of the interesterified component was deemed essential in order to reduce recrystallisation, which is the cause of sandiness.

In later developments it was attempted to lower this high level of the interesterified component while keeping sandiness at a low level. This resulted in fat blends as described in Canadian Patent No. 1 113 779, which contain 25–50% of an interesterified component obtained from the random interesterification of a low-trans hardened sun-flower oil and non-hardened sunflower oil.

In the above patents specifications fat blends are described which have a level of hydrogenated fats higher than 35% and sometimes even higher than 45%, whereby the need for a fat with a high level of linoleic acid is not sufficiently met.

Applicants have found fat blends and a process for producing blends having a low risk of developing sandiness and meeting the long felt need for a physiologically beneficial fat, i.e. a fat with a level of linoleic acid residues preferably higher than about 30% with good organoleptic properties.

The process according to the invention in its most general form comprises adding to fats which are prone to sandiness an effective amount of a fat rich in palmitic acid residues and interesterifying the mixture thus obtained.

The precise nature of the various components and the process conditions are described further in the specification.

The fat blend according to the invention comprises: an oil (a) having a level of linoleic acid residues of at least 20%, a hydrogenated fat (b) having a level of palmitic acid residues of at least 10%, obtained by interesterification of a fat (d) containing an appreciable proportion of palmitic acid residues, with a fat (c) which is prone to sandiness.

Oil (a) preferably comprises sunflower oil, safflower oil, soybean oil, corn oil, rapeseed oil or mixtures thereof.

Fat (c) preferably comprises an oil (a) which has been hydrogenated to a melting point ranging from 30° to 40° C. preferably under conditions promoting isomerisation conducive to mono-trans unsaturated acids, e.g. using sulphur-poisoned nickel catalyst at a temperature ranging from 140° to 180° C. An appropriate proportion of this component is used to achieve in the final blend a level of trans acids preferably ranging from 15 to 30%, ideally from 15 to 20% (measured according to A.O.C.S. Tentative Method Cd 14-61).

Fat (d) is preferably selected from palm oil, cottonseed oil, butterfat, tallow fat, herring oil, menhaden oil or mixtures of these fats or fractions thereof, in non-hydrogenated or in hydrogenated form.

Fat (d) has a level of palmitic acid residues preferably ranging from 50 to 90%. Fat (d) preferably consists of a stearin fraction obtained by fractionation of palm oil, preferably in the presence of a solvent and ideally in the presence of acetone at 18°–24° C. using a solvent: oil ratio of 4:1–5:1.

It is however also possible to produce a stearin fraction by dry-fractionation of palm oil (in the absence of a solvent) or in the presence of an aqueous solution of a surface-active agent such as sodiumlaurylsulphate (so-called Lanza fractionation).

Fat (a) and fat (c) preferably originate from the same source. Fat (a) preferably consists of sunflower oil and fat (c) preferably consists of sunflower oil hydrogenated to a melting point preferably ranging from 34° to 43° C., because of the good melting properties resulting thereof.

According to the invention fat (b) can be obtained by first carrying out interesterification of a non-hydrogenated oil with the fat rich in palmitic acid residues and then hydrogenating the interesterified mixture to a melting point ranging from 30° to 48° C. and preferably from 34° to 43° C., or by first hydrogenating the oil and subsequently conducting the interesterification of the hydrogenated oil with the fat rich in palmitic acid residues.

Interesterification may involve random interesterification and directed interesterification, which means an interesterification combined with a crystallization of the high melting triglycerides present in the mixture, which can subsequently be filtered off.

Preferably, random interesterification is carried out under substantially moisture-free conditions (0.01% water) under vacuum, using a classical catalyst such as an alkalimetal alkoxide, an alkali metal such as sodium, or dry sodium hydroxide.

Oil (a) is preferably present in a proportion ranging from 30 to 75%, more preferably from 60 to 75%. Oil (a) preferably consists of sunflower oil having a level of linoleic acid residues of 60–70%.

The interesterified fat (b) can be present in an amount up to 70%, but preferably within the range of 25 to 40% by weight.

In fat (b) the ratio of fat (c) to fat (d) ranges from 20:1 to 5:1, preferably from 14:1 to 7:1. Fat (d) constitutes 1–15%, preferably 2–8% of the total blend, whereas the remainder of the fat stems from hydrogenated and non-hydrogenated oil (a).

The preferred fat blend according to the present invention will contain a level of linoleic acid residues ranging from 30 to 55% and preferably from 40 to 48%.

The fat blend according to the invention does not display sandiness on storage at 20° C. for a period of five weeks or longer.

The above description and examples were focussed on fat blends essentially consisting of components (a) and (b) as hereinbefore defined. It goes without saying that fat blends can be produced which comprise a minor proportion, preferably less than 10%, of an additional fat component which was not subjected to interesterification, such as a hydrogenated oil, e.g. palm kernel oil hydrogenated to a melting point of 38° C.

The invention will now be illustrated in the following examples:

EXAMPLE 1

A fat blend was produced starting from 67% of sunflower oil, 33% of a randomly interesterified blend consisting of 91% of sunflower oil hardened to a melting point of 34° C. and 9% of acetone-fractionated palm oil stearin.

Interesterification was carried out using a catalyst consisting of a 30 wt% dispersion of sodium in oil. A proportion of 0.15 wt%, based on the fat, of this dispersion was used. Interesterification was carried out for half an hour under nitrogen. The reaction was stopped with 2 wt% of water, based on the fat, and soap which had been found was removed by adding 2 wt% of bleaching earth. The mixture was filtered over a hyflo filter aid.

Hydrogenation was carried out using 0.3 wt% of a sulphur-poisoned nickel catalyst (5.5 g S/100 g Ni). Hydrogenation of sunflower oil was carried out in two steps, firstly at 150° C. and subsequently at 180° C. to achieve a melting point of 34° C.

Fractionation of palm oil was carried out using dry acetone at 18°–24° C. The solvent:fat ratio was 4:1.

The level of palmitic acid residues in the interesterified blend was 13.8%.

The level of palmitic acid residues in the palm oil stearin obtained by acetone fractionation was 83.6%.

The level of trans fatty acids in the total fat blend was about 19.5%.

The level of linoleic acid residues in the total fat blend was 46.4%.

The solid fat content at various temperatures obtained by nuclear magnetic resonance measurements were
$N_{10}=24.7$
$N_{20}=13.1$
$N_{30}=2.7$
$N_{35}=0$
The measurements were carried out essentially as described in "Fette, Seifen, Anstrichmittel" 80, 180–186 (1978).

A margarine was produced starting from the above fat blend and an aqueous phase containing 16% of water, 0.27% of skim milk powder, 0.5% of starch, 0.3% of sodium chloride and 0.07% of potassium sorbate, pH=4.5. The fat phase (82.86%) contained 82.74% of the fat blend, 0.05% of a monoglyceride and 0.07% of lecithin.

The margarine was produced on a Votator.

The product obtained was stored for 9 weeks at 20° C. On consumption no sandiness was perceived. Examination of the product under the microscope did not reveal a substantial amount of needles of crystallized fat, which means that the fat had a low risk of developing sandiness on further storage.

EXAMPLE 2

The general procedure of Example 1 was repeated, with the difference that the fat blend consisted of 70% of sunflower oil and 30% of a randomly interesterified blend consisting of 91% of sunflower oil hardened to a melting point of 37° C. and 9% of the acetone-fractionated palm oil stearin.

The level of palmitic acid residues in the interesterified mixture was 13.4%.

The level of trans fatty acids in the total fat blend was about 18.6%.

The level of linoleic acid residues in the total fat blend was 47.1%.

The solid fat contents at various temperatures were:
$N_{10}=24.8$
$N_{20}=13.9$
$N_{30}=3.4$
$N_{35}=0$ Microscopic examination of a margarine produced with this fat blend, according to the procedure outlined in Example 1 revealed no sandiness after a storage period of 9 weeks at 20° C. On consumption the margarine was as good as the product of Example 1.

EXAMPLE 3

The general procedure of Example 1 was repeated with the following fat blend:

74% of sunflower oil and 26% of a randomly interesterified blend consisting of 91% of sunflower oil hardened to a melting point of 39° C. and 9% of acetone-fractionated palm oil stearin.

The level of palmitic acid residues in the interesterified blend was 13.4.

The level of trans fatty acids in the total fat blend was 13.7.

The level of linoleic acid residues in the total fat blend was 51%.

The solid fat contents at various temperatures were:
$N_{10}=22.7$
$N_{20}=13.0$
$N_{30}=4.0$
$N_{35}=0.7$ Microscopic examination of a margarine produced with this fat blend, according to the procedure outlined in in Example 1, revealed no sandiness after a storage period of 9 weeks at 20° C. On consumption the margarine was as good as the product of Example 1.

EXAMPLE 4

The general procedure of Example 1 was repeated with the following fat blend:

69% of sunflower oil, 31% of an interesterified fat blend consisting of 91% of sunflower oil and 9% of acetone-fractionated palm oil stearin.

The interesterified blend was hydrogenated as a whole to a melting point of 37° C.

The palmitic acid content of the interesterified blend was 12.7%. The level of trans fatty acids in the total fat blend was 17.1%. The level of linoleic acid residues in the total fat blend was 48.2%.

The solid fat contents at various temperatures were:
$N_{10} = 24.9$
$N_{20} = 13.5$
$N_{30} = 3.5$
$N_{35} = 0$.

Microscopic examination of a margarine produced with this fat blend, according to the procedure outlined in Example 1, revealed no sandiness after a storage period of 9 weeks at 20° C. On consumption the margarine was as good as the product of Example 1.

EXAMPLES 5-7

Three fat blends were produced according to the procedure outlined in Example 1. All three blends comprised 70% of sunflower oil and 30% of various interesterified mixtures.

In Example 5 the interesterified mixture consisted of 90% of rapeseed oil hydrogenated to 43° C. and 10% of the above-mentioned stearin fraction.

In Example 6 the interesterified mixture consisted of 95% of soybean oil hydrogenated to a m.p. of 41° C. and 5% of the above-mentioned stearin fraction.

In Example 7 the interesterified mixture consisted of 95% of corn oil hydrogenated to 35° C. and 5% of the above-mentioned stearin fraction.

Microscopic examination of margarines produced from the above fat blends revealed no sandiness after a storage period of 5 weeks at 20° C.

The level of trans fatty acids, the level of linoleic acid in the fat blends and the palmitic acid content in the interesterified mixtures of Examples 5-7 were as follows:

| Example | Level of trans fatty acids | Level of linoleic acid | Level of palmitic acid in interest. mixt. |
| --- | --- | --- | --- |
| 5 | 15% | 46% | 13.2% |
| 6 | 21% | 46% | 15.2% |
| 7 | 21% | 46% | 14.1% |

EXAMPLES 8 and 9

Two fat blends were produced from 70% of sunflower oil and 30% of a randomly interesterified mixture.

In Example 8 the interesterified mixture consisted of 40% of cottonseed oil (m.p. 37° C.) and 60% of sunflower oil (m.p. 41° C.).

In Example 9 the interesterified mixture consisted of 20% of hydrogenated palm oil (m.p. 44° C.) and 80% of sunflower oil (m.p. 41° C.).

Microscopic examination of margarines produced from the above fat blends revealed no sandiness after a storage period of 5 weeks at 20° C.

The level of trans fatty acids, the level of linoleic acid in the fat blends and of the palmitic acid residues in the interesterified mixtures of Examples 8-9 were as follows:

| Example | Level of trans fatty acids | Level of linoleic acid | Level of palmitic acid in interest. mixt. |
| --- | --- | --- | --- |
| 8 | 19% | 46% | 12.9% |
| 9 | 19% | 46% | 14.3% |

EXAMPLE 10

A fat blend was produced from 45% of sunflower oil and 55% of a randomly interesterified mixture of sunflower oil (m.p. 41° C.) and 10% of the stearin fraction obtained by acetone fractionation of palm oil (Ex. 1).

Microscopic examination of margarines produced from the above fat blend revealed no sandiness after a storage period of 5 weeks at 20° C.

The level of trans fatty acids in the fat blend was 34%; the level of linoleic acid was 30%.

We claim:

1. A margarine fat blend with a reduced tendency to sandiness, defined as a fat blend which does not contain a substantial proportion of needle-like fat crystals with a size ranging from 10 to 50 microns, which fat blend comprises: an oil (a) having a level of linoleic acid residues of at least 20% and a hydrogenated fat (b) having a level of palmitic acid residues of at least 10% obtained by interesterification of a fat (d) having a level of palmitic acid residues ranging from 50 to 90%, with a fat (c) containing trans-fatty acid residues, wherein the ratio of fat (c) to fat (d) ranges from 20:1 to 5:1.

2. A margarine fat blend according to claim 1, wherein fat (c) consists of an oil selected from the group consisting of sunflower-, safflower-, soybean-, corn- and rapeseed oil, said oil being hydrogenated to a melting point ranging from 30° to 40° C., under conditions promoting isomerism.

3. A margarine fat blend according to claim 2, wherein the level of trans-fatty acids ranges from 15 to 30%.

4. A margarine fat blend according to claim 1, wherein fat (c) consists of sunflower oil hydrogenated to a melting point ranging from 34° to 43° C. and fat (a) consists of sunflower oil.

5. A margarine fat blend according to claim 1, wherein fat (d) consists of a fat fraction in hydrogenated or non-hydrogenated form, obtained by fractionation of a fat selected from the group consisting of palm oil, tallow, herring oil, menhaden oil, cottonseed oil and butterfat.

6. A margarine fat blend according to claim 5, wherein fat (d) consists of a palm stearin fraction.

7. A margarine fat blend according to claim 6, wherein fat (d) consists of a palm stearin fraction obtained by fractionation of palm oil in the presence of a solvent.

8. A margarine fat blend according to claim 7, wherein fat (d) consists of a palm stearin fraction obtained by fractionation of palm oil in the presence of acetone, at a temperature ranging from 18° to 24° C.

9. A margarine fat blend according to claim 1, wherein the ratio of fat (c) to fat (d) ranges from 14:1 to 7:1.

10. A margarine fat blend according to claim 1, wherein fat (d) constitutes 1-15% of the total weight of the fat blend, whereas the remainder of the fat stems from oil (a) and fat (c).

11. A margarine fat blend according to claim 10, wherein fat (d) constitutes 2-8% of the total weight of the fat blend.

12. A margarine fat blend according to claim 1, wherein oil (a) is present in a proportion ranging from 30 to 75% and fat (b) is present in a proportion ranging from 25 to 70%.

13. A margarine fat blend according to claim 12, wherein oil (a) is present in a proportion ranging from 60 to 75% and fat (b) is present in a proportion ranging from 25 to 40%.

14. A margarine fat blend according to claim 1, wherein oil (a) is selected from the group consisting of sunflower-, safflower-, soybean-, corn- and rapeseed oil.

15. A margarine fat blend according to claim 1, wherein the level of linoleic acid residues ranges from 30 to 55%.

16. A margarine fat blend according to claim 1, wherein fat (b) is a fat obtained by first carrying out interesterification of a non-hydrogenated oil with fat (d) and subsequently hydrogenating the interesterified mixture to a melting point ranging from 30° to 48° C.

17. A margarine fat blend according to claim 1, wherein fat (b) is a fat obtained by first hydrogenating an oil and subsequently conducting interesterification of the hydrogenated oil with fat (d).

* * * * *